(No Model.)
H. H. HAWLEY.
LAMP WICK TRIMMER.
No. 332,900. Patented Dec. 22, 1885.
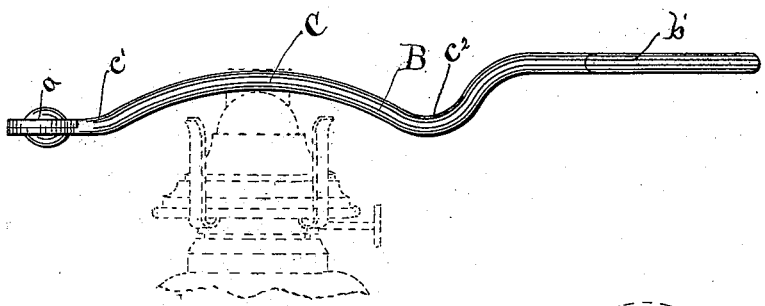
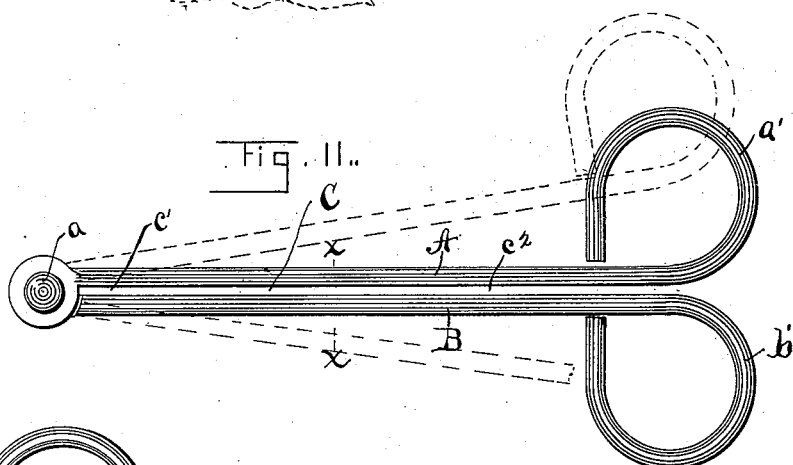
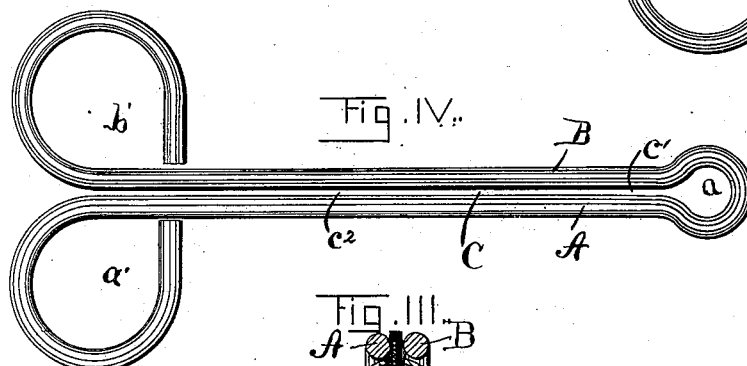
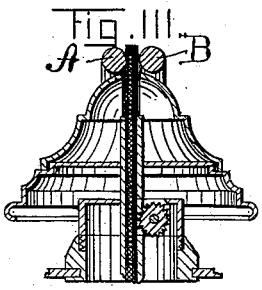
Witnesses:
W. Pell Rubis.
W. C. Orcutt
Inventor.
Harry H. Hawley,
By Richards & Co.
Attorneys.

UNITED STATES PATENT OFFICE.

HARRY H. HAWLEY, OF MALONE, NEW YORK.

LAMP-WICK TRIMMER.

SPECIFICATION forming part of Letters Patent No. 332,900, dated December 22, 1885.

Application filed April 20, 1885. Serial No. 162,757. (No model.)

*To all whom it may concern:*

Be it known that I, HARRY H. HAWLEY, a citizen of the United States, residing in Malone, in the county of Franklin and State of New York, have invented a new and useful Improvement in Lamp-Wick Trimmers; and I hereby declare the following to a full and clear description thereof.

This invention has for its object the construction of an implement for clamping and holding the charred end of a lamp-wick so that the charred end may be rubbed off and the wick thus trimmed and made ready for relighting; and it consists of the peculiar construction hereinafter claimed.

The invention will be readily understood by reference to the accompanying drawings, of which Figure I is a side elevation of the improved lamp-trimmer, and in dotted lines the top part of a lamp, its cone, and shade-holder are shown. Fig. II is a general plan of the improved trimmer, showing it closed in full lines and open in dotted lines. Fig. III is a section of the said improved trimmer, taken on the line $x\ x$ of Fig. II, and showing the lamp-wick clamped between the said trimmer-arms. Fig. IV is a plan of the clamp made in one piece.

This implement consists of two arms or clamping bars, A B, hinged or jointed together at one of their ends at $a$ and the other ends of the said arms or clamping-bars made to terminate, respectively, in handle-pieces $a'$ $b'$, like the handles of a pair of shears. The two arms or clamping-bars being joined at $a$ by a hinge or pivot pin and provided at their other ends with handles $a'\ b'$, for holding them, they are held and operated much like a pair of pinchers or a pair of shears so far as the movement of the arms is concerned.

I have shown the pivot-pin $a$, placed at the outer end or the end of the arms or clamping-bars opposite their handle ends, and this is probably the best and most compact form to construct them in; but it is obvious that it is practicable and within the scope of this invention to place the said pivot-pin more nearly in the central part of the said arms or clamping-bars and still make the implement practically the same as that which I have shown.

The simplest and best method of constructing this implement is to make it of merchantable wire of a single piece, the two sides A B being bent around, as in Fig. IV, so as to form a hinge between the two said side bars, and in the same manner the curved trimming part C is bent upwardly into the proper convexity for the trimming of the wick, as described.

The only difference is that in the implement, as I have shown it and as I prefer to make it, the central part of the said arms is used as the operative part, while in the other case the outer end would be made the operative part. The said arms or clamping-bars A B are preferably made of round bars, as shown in Fig. 3, though the shape of the section of the said bars is not essential. The operative part of the said arms or clamping-bars, as shown between the points $c'$ and $c^2$, is formed in a laterally-directed curve, C, so as to make the convex side of the bars or arms (the upper side when in use) convex, and the convexity of this part is just the shape the top of a lamp-wick should be trimmed to secure the best possible illuminating results.

The implement, constructed as above described, is operated in the following manner: The wick to be trimmed is turned up, so that its charred end is elevated slightly above the top of the cone, and then the clamping-bars A B are made to embrace the sides of the said wick near its upper end, as shown in Figs. 1 and 3. In this position the convexed part C is placed centrally over the cone of the lamp. The clamp is then tightly squeezed upon the sides of the wick by means of its handles, grasped shearwise, and then the operator, with a cloth, is to brush off the charred end of the wick, and thus fit it for relighting. Of course, in turning up the wick and applying the trimmer-clamp to it care must be taken to elevate the wick above the top edge or face of the trimmer-clamps only just enough to properly clean off the thoroughly charred and hardened part of the wick, and then when the said charred part of the wick is rubbed down even with the top part of the clamping bars or arms the trimming will be complete and the lamp will thereafter burn with a beautifully-rounded and broad flame and give the best possible illuminating effect.

The laterally-convexed trimming part C of the said clamping-bars is an important feature in this implement, as it enables the operator to bring the trimming-clamp down close to the top of the clamp-cone, and thereby keep the trimming débris from the charred wick from falling through slots of the cone and lodging on the perforated diaphragm of the clamp-cap, thereby obstructing its operation and also endangering the use of the lamp by the risk of firing such refuse deposit, and the said convexed part C also regulates the curve of the trimmed wick to the exact proper form for the best illuminating results.

An incident of the advantage of this trimmer is found in the very great economy of the wick, as only the completely charred and worthless part is eliminated at each trimming operation.

Having thus described my invention, what I claim as new, and desire to secure by Letters Patent, is—

A lamp-wick trimmer formed of a single piece of merchantable wire bent around at its forward end so as to hinge together the two side bars, A B, of which the trimmer is formed, and bent upward at C, so as to form on said bars a convex trimming-surface, as described.

In witness whereof I have hereunto set my hand this 15th day of April, 1885.

HARRY H. HAWLEY.

In presence of—
GEORGE SABIN,
JAMES A. STOCKWELL.